(12) United States Patent
Kasamatsu et al.

(10) Patent No.: US 6,410,103 B1
(45) Date of Patent: Jun. 25, 2002

(54) MEMORY DISC, MANUFACTURING METHOD THEREOF, AND METHOD OF MANUFACTURING DISC DRIVE UTILIZING SUCH MEMORY DISC

(75) Inventors: Yoshiharu Kasamatsu; Takashi Toyoguchi; Takayuki Yamamoto, all of Kanagawa (JP)

(73) Assignee: Fujitsu Limited, Kawasaki (JP)

(*) Notice: Subject to any disclaimer, the term of this patent is extended or adjusted under 35 U.S.C. 154(b) by 0 days.

(21) Appl. No.: 09/256,887

(22) Filed: Feb. 24, 1999

(30) Foreign Application Priority Data

Jul. 24, 1998 (JP) .......................... 10-209734

(51) Int. Cl.$^7$ .............................................. G11B 5/725
(52) U.S. Cl. ................... 427/553; 427/558; 427/130; 427/131; 428/694 TF
(58) Field of Search ................... 428/141, 336, 428/65.4, 694 TC, 694 TF, 900; 427/130, 131, 553, 558

(56) References Cited

U.S. PATENT DOCUMENTS

| | | | |
|---|---|---|---|
| 4,960,609 A | * 10/1990 | Homola et al. ............... 427/38 |
| 5,157,066 A | * 10/1992 | Shoji et al. ................. 524/220 |
| 5,292,585 A | * 3/1994 | Ohnuki et al. .............. 428/336 |
| 5,545,478 A | * 8/1996 | Lin et al. ..................... 428/332 |
| 5,674,582 A | * 10/1997 | Eltoukhy ..................... 428/65.4 |
| 5,741,577 A | * 4/1998 | Yamamoto et al. ......... 428/212 |
| 5,750,747 A | * 5/1998 | Furutani et al. ............... 554/36 |
| 5,798,164 A | * 8/1998 | Weiss et al. ................. 428/141 |
| 6,007,896 A | * 12/1999 | Bhushan ..................... 428/141 |
| 6,096,385 A | * 8/2000 | Yong et al. .................. 427/510 |
| 6,120,694 A | * 9/2000 | Kasamatsu ................... 216/22 |

FOREIGN PATENT DOCUMENTS

| | | |
|---|---|---|
| DE | 19531746 | * 3/1996 |
| EP | 0 643 385 | * 3/1995 |
| WO | WO97/15049 | 4/1997 |

OTHER PUBLICATIONS

M. Shoji et al., Japan; "Analysis of Adsorbed Film Structures of Lubricants by X–Ray Reflectivity"; Tribologist, vol. 43, No. 3, pp. 242–249; 1998.

* cited by examiner

*Primary Examiner*—Stevan A. Resan
(74) *Attorney, Agent, or Firm*—Greer, Burns & Crain, Ltd.

(57) ABSTRACT

A memory disc for use in a memory disc, comprising a lubricant layer which consists essentially of a non-fluid bonding lubricant, or comprises a lubricant layer which contains at least 90% of non-fluid bonding lubricant. Such memory disc is fabricated through steps of: forming a protective carbon layer; coating a lubricant on a disc substrate; subjecting the resultant substrate to an adhesion treatment to form a bonding layer of lubricant adhering to the disc substrate; and removing a free fluid layer of the lubricant remaining on the bonding layer. Thus, the memory disc has essentially no fluid component that can flow during read/write operations.

2 Claims, 11 Drawing Sheets

Coating with a fluoride lubricant

FIG. 2B

Curing

FIG. 2C

Removal of free-layer

First embodiment

FIG. 3A

Coating with a fluoride lubricant

FIG. 3B

Curing

FIG. 3C

Removal of free-layer

Second embodiment

Thicknes of a lubricant layer/Ra

FIG. 7

MEMORY DISC, MANUFACTURING METHOD THEREOF, AND METHOD OF MANUFACTURING DISC DRIVE UTILIZING SUCH MEMORY DISC

BACKGROUND OF THE INVENTION

1. Field of the Invention

The invention generally relates to a memory disc for use in a memory disc device such as magnetic disc drives and optical disc drives, and more particularly to a memory disc having thereon a lubricant layer.

2. Description of the Prior Art

Hard disk drives (HDD) have been commonly used as auxiliary memory devices for personal computers and engineering work stations to store a large amount of information. A HDD uses a magnetic disk to read/write information on the disc. In order to deal with ever increasing information, efforts have been made to improve their capacity for a higher recording density as well as their down sizing. For example, up until 1991, the recording density on a magnetic disk was increased at the rate of about 10 times per 10 years. It was then prospected that the recording density would be $10^3$ Mega bytes (MB)/in$^2$ (1 Gb/in$^2$) by the year of 2000.

However, in actuality the recording density has increased much faster than the prospect, especially in the field of 3.5 inch HDD or smaller ones, owing in part to the recent developments of a new type of magnetic heads called magnetoresistive (MR) heads and a new recording method (known as PRML method: Partial Response Maximum Likelihood method). In fact the linear recording density reached 1 Gb/in$^2$ in 1995.

A magnetic disk, which is one of the major components of a HDD, is typically made by either one of three processes/methods: a coating method in which a resin dispersed with a mixture of aluminum and gamma iron oxide is coated on a metallic disk substrate, which is then sintered and hardened; a plating method in which a magnetic material such as CoNiP is plated on a disk substrate; and a sputter-deposition process in which gamma iron oxide is sputter-deposited to form a ferrite film on a disk substrate.

Most recent magnetic disks having intermediate sizes, i.e. 5.25 inch and smaller in diameter, are made by sputter deposition processes in forming a thin magnetic film of cobalt alloy such as CoNi, CoCrTa, and CoPtCr. This is mainly because sputter deposition processes are suited for controlling magnetic properties of a magnetic film to be deposited and for ease of realizing a higher residual magnetization density to compensate for a low linear tracking speed on a small magnetic disk.

On the other hand, efforts has been focused on an improvement of magnetic heads which facilitate an increased data storage capacity on a magnetic disc while minimizing the dimensions of the disc drive, and magnetic induction heads, which are well known magnetic heads for conventional discs, are now substituted for by a more advanced type of magnetoresistive (MR) heads. These magnetoresistive heads are highly sensitive to an externally applied magnetic field. Their sensitivity is much higher than that of conventional heads, and they are capable of providing a 5 to 10 times larger output than the conventional heads under the same operational conditions, thereby enabling a higher recording density. Recently, development of another type of sensitive magnetic heads, Giant magnetoresistive (GMR) heads having a still higher sensitivity, has been also in progress.

In this manner, magnetic disc devices have been improved intensively for a higher density and compactness, and accordingly the reduction of lift of a magnetic head (i.e. the height of the magnetic head floating over the disc) to ensure efficient read/write.

Most magnetic disc devices generally employ "contact start-stop", CSS) scheme, in which the magnetic head is at rest on a circumferential region (CSS region) of the magnetic disc within a few millimeters from the periphery of the disc during its non-operating period. As the disc is driven fast for rotation, the disc drags air with it, establishing an air flow between the magnetic head and the disc, thereby lifting or floating the head above the disc. In order to keep the magnetic head in stable equilibrium in the floating position, the head is typically provided with a head slider having a complex rail configuration to support the head. The head slider may be formed by a photo-lithography technique.

For the reduction of the lift, it is required to reduce the roughness of the disc surface so that the magnetic head will not make collision with the magnetic disc during read/write operations. However, if the roughness is too small, a net contact area between the magnetic head and the magnetic disc will become too large, which often causes the magnetic head to adhere or stick to the magnetic disc and causes it to fail to float. In fact, such adhesion can take place if the surface of the disc is lubricated by a lubricant layer having a thickness of 1.0 nm or greater. In order to avoid such adhesion, it is preferred to coat the disc with a very thin layer of lubricant, to a thickness of about a few Angstrom.

Another approach to the reduction of the possible adhesion of the magnetic head as mentioned above is a technique known as "Zone Texture Technique", in which minute protrusions are provided either on the rails of a magnetic head or on the disc surface in the CSS region so as to minimize effective contact area between the magnetic head and the disc.

3. Problems to be overcome by the Invention

These protrusions, however, will result in a large pressure on the small contact area of each protrusion, and therefore it is likely that the lubricant layer in the contact area will be easily worn out if the lubricant layer is very thin. Lack of the lubricant layer in the contact area will result in solid-solid contact between the magnetic head and the disc, causing impermissible friction between them. It is often the case that protrusions are also worn out quickly under such condition.

The present inventors tried to improve wear resistance of a magnetic disc device by providing a thicker lubricant layer on the magnetic disc and forming harder protrusions on either a magnetic head or the disc. However, he has found that a thick layer of conventional lubricant on the disc cannot reduce the friction between them, due to the fact that the lubricant eventually gets moved radially outward by centrifugal forces acting on it while spinning the disc.

SUMMARY OF THE INVENTION

It is therefore an object of the invention to provide a noble magnetic disc, considering from the problems mentioned above.

It is another object of the invention to provide a noble method of manufacturing such noble magnetic disc.

It is a still another object of the invention to provide a memory disc which is less wearable.

It is a further object of the invention to provide a memory disc which may reduce wear of a head slider in a memory disc device.

In one aspect of the invention, there is provided a memory disc, comprising a lubricant layer which substantially consists only of a non-fluid bonding layer of lubricant.

In another aspect of the invention, there is provided a memory disc, comprising a lubricant layer which contains at least 90% of non-fluid bonding layer of lubricant.

In a still another aspect of the invention, there is provided a memory disc for use in a recording medium, which has an average roughness Ra of 1.0 nm or less and has a lubricant layer of 1.5 nm or greater in thickness.

In a further aspect of the invention, there is provided a memory disc drive, comprising a memory disc as mentioned above; a magnetic read/write head equipped with a head slider having slider rails which comprise on the opposite sides thereof protrusions; and a drive mechanism for driving the memory disc.

In a still further aspect of the invention, there is provided a memory disc drive, comprising a memory disc as mentioned above, a read/write head, and a drive mechanism for driving the memory disc, and protrusions on the memory disc within the CSS region thereof.

In a still further aspect of the invention, there is provided a method of manufacturing a memory disc, comprising steps of:

coating a lubricant on a disc substrate having a carbon protective layer;

providing an adhesion-treatment to the substrate so as to bond the lubricant to the disc substrate; and removing a free fluid layer of lubricant not bonded to the disc substrate.

In the inventive method above, the lubricant may be a fluoride lubricant. The adhesion treatment may be carried out by irradiation of ultra-violet light or short-wavelength ultra-violet light, which may be done in two stages: first only on the CSS region of the disc substrate and second on the entire region of the disc substrate.

In a still further aspect of the invention, there is provided a method of manufacturing a memory disc, comprising steps of:

forming a disc substrate of an aluminum alloy;

plating the aluminum alloy disc substrate with NiP;

forming on the NiP-plated substrate an underlayer;

forming a magnetic layer on the underlayer;

forming a protective carbon film on the magnetic layer;

forming a lubricant layer on the protective carbon film, wherein the step of forming the lubricant layer further includes steps of:

coating a fluoride lubricant on the carbon protective film; and giving an adhesion treatment to the substrate by irradiating ultra-violet light or short-wavelength ultra-violet light to the lubricant to thereby forming a non-fluid layer (bonding layer) of lubricant; and removing free fluid layer of lubricant from the substrate.

A typical example of memory discs is a magnetic disc or an optical disc.

It should be noted that as mentioned above the invention utilizes a non-fluid bonding layer as a lubricant layer on the memory disc for facilitating reduction of the friction between the head slider of a head and the memory disc during read/write operations by the head while it is in rotational motion over the disc, thereby reducing the wear of the lubricant layer caused by the friction.

With a thicker lubricant layer in the CSS region than in the data region, friction between the lubricant layer and the head slider is greatly reduced in the CGS region, so that the lubricant layer will become durable over extended periods of time.

Embodiments of memory disc, manufacturing method thereof, and method of manufacturing disc drive utilizing such memory disc in accordance with the present invention will be explained in detail with reference to the accompanying drawings hereinafter.

DETAILED DESCRIPTION OF THE PREFERRED EMBODIMENT

Although the invention particularly pertains to a lubricant layer and a lubricant therefor, we will give a general description of a magnetic recording medium and a method of manufacture thereof for the sake of better understanding of the invention, prior to describing particular example embodying the invention.

[Structure of Magnetic Disc and Method of Its Manufacture]

Figure 1A:
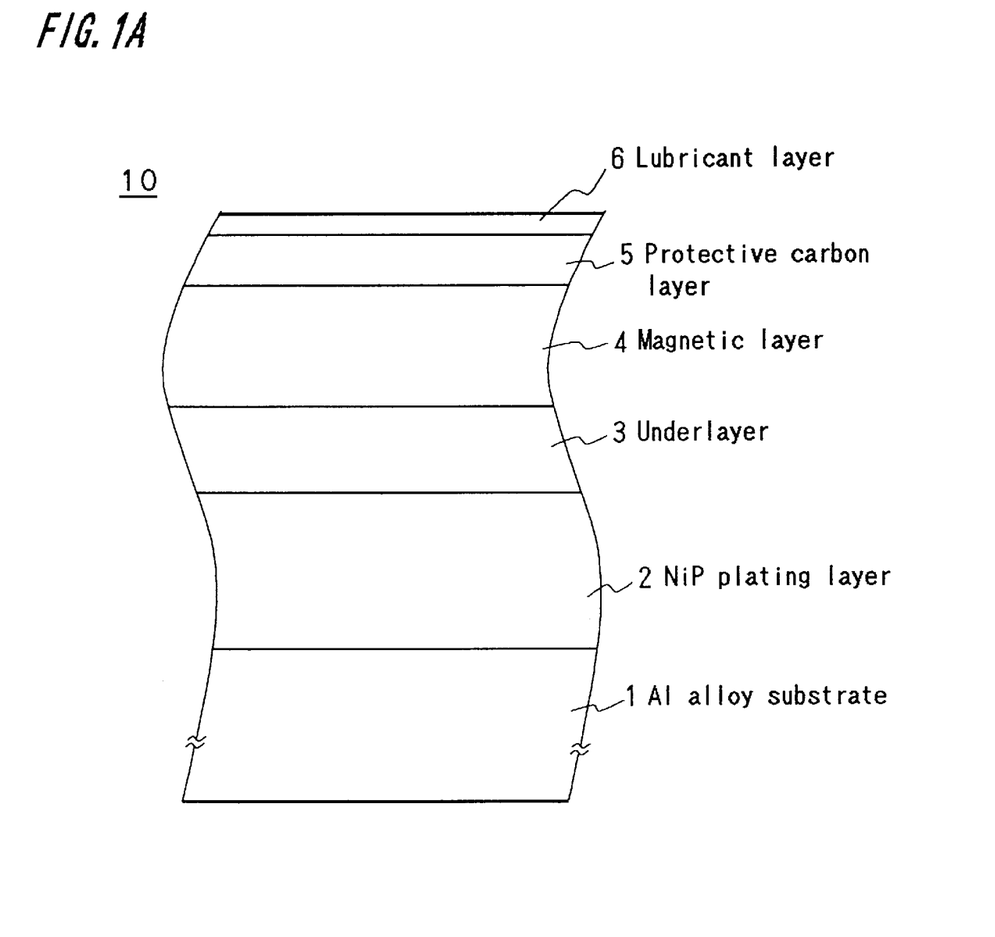
FIGS. 1A is a cross sectional view of a magnetic disc.

Referring to FIG. 1A, there is shown a magnetic disc 10 having a typical structure as shown.

It should be understood that the magnetic disc 10 is shown in FIG. 1A as having a recording medium on one side of the substrate for simplicity of illustration, the disc may have the same but mirrored structure equally well on the other side of the disc substrate, as desired.

Figure 1B:
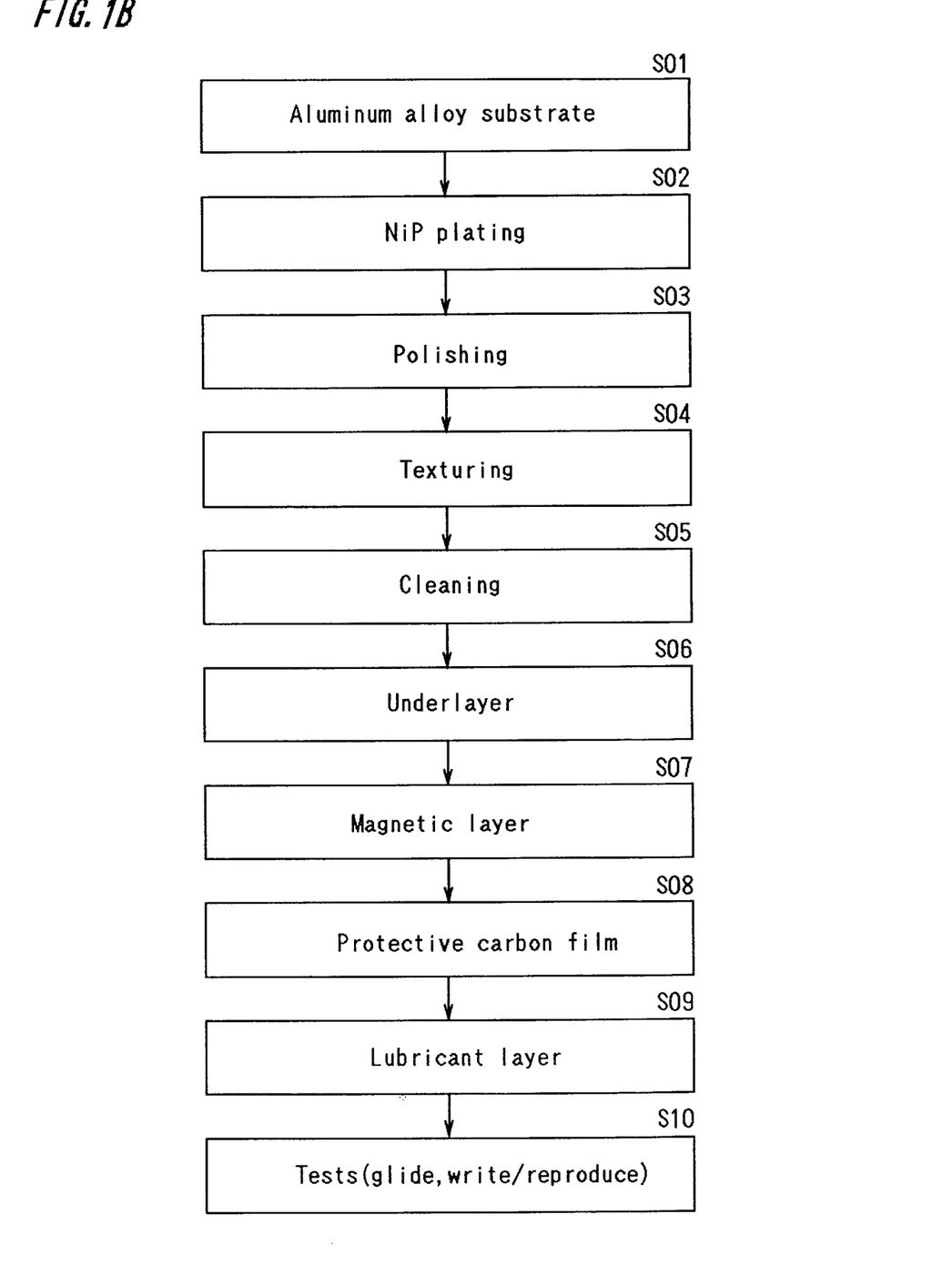
FIG. 1B is a flow-chart of a process for manufacturing the magnetic disc as shown in FIG. 1A.

The multi-layer structure of the disc as shown in FIG. 1 is manufactured through steps as shown in FIG. 1B.

In step S01, referring to FIGS. 1A and 1B, an aluminum alloy substrate 1 in the form of a thin plate is prepared for an HDD. The aluminum alloy is preferably a wear resistant aluminum alloy, for example AA-5086 having a modified composition.

The thin aluminum alloy plate thus obtained is subjected to such processes as blanking, heat treatment, and chamfering and ground by a grind stone, making an aluminum alloy substrate 1 having a structure as shown in FIG. 1A. The aluminum substrate 1 itself must have a required precision and a flatness necessary for a magnetic head to float above a finished disc at a small distance therefrom.

In step S02, the aluminum alloy substrate 1 is plated on the surface thereof with NiP in a non-electric or electroless plating process to form a plating layer 2. This plating layer 2 is needed to provide the aluminum substrate with sufficient hardness and flatness in minimizing the wear of the substrate caused by friction with the magnetic head during a start-and-stop period of read/write operation, since the aluminum substrate 1 is rather soft.

Although Ni itself is magnetic, the NiP plating layer 2 must not be magnetic so that it will not be a source of magnetic noise, even after a sputtering process and a heat treatment described below. Thus, the NiP layer is prepared by adding P to Ni in the non-electric plating process, to thereby making a resultant NiP anomalous.

In step S03, the aluminum substrate, now plated with NiP on the opposite sides thereof (hereinafter referred to as plated aluminum substrate), is polished by buffs using a fine alumina abrasive, for example, until the NiP layer 2 obtains mirror finish.

In step S04, a texture treatment or texturing is applied to the polished plated aluminum substrate. This is a mechanical process to provide a proper roughness, or texture, to the mirror surface of the NiP layer 2 to prevent adhesion or sticking of the magnetic heads to the disc surface during the start-and-stop operations. The texture treatment will result in proper grooves in the NiP layers 2, thereby reducing net or effective contact areas between the heads and the disc surfaces.

In step S05, the plated aluminum substrate is washed or cleaned.

The clean substrate is then provided with an underlayer 3 (step S06), a magnetic layer 4 (step S07), and a protective carbon film 5 (step S08), using stationary opposing target type sputtering apparatuses. In the example shown herein the underlayer 3 is formed on the clean plated substrate placed between two opposing targets of a first sputtering apparatuses until the sputtered underlayer reaches a predetermined thickness. The sputtered substrate is then moved to a second sputtering apparatus for further sputtering of the magnetic layer 4, and so on, until the three different layers are formed on the substrate.

In step S06, the underlayer 3 is formed on top of the NiP plating layer 2 as shown in FIG. 1. The underlayer 3 is needed to ensure the magnetic layer 4 to behave properly as a magnetic medium. The underlayer 3 is typically chromium or a chromium alloy such as $Cr_{90}Mo_{10}$ (by weight %).

The magnetic layer 4, formed on the underlayer 3 in step S07, may be a cobalt alloy such as CoPtCr, which is made by adding Cr and Pt to Co for enhancing coercive force in the magnetic layer and at the same time controlling its magnetic noise.

The magnetic properties of the magnetic layer 4 depend on the magnetic anisotropy and the crystalline structure thereof, so that the composition of the magnetic layer 4 (i.e. relative abundance of cobalt, platinum, and chromium in the layer 4) as well as the thickness of the underlayer 3 are optimized for reduction of magnetic noise involved in addition to texturing as explained in step S04. The texture treatment of the aluminum substrate also facilitates suppression of the noise.

In the example shown herein the magnetic layer 4 as shown in FIG. 1 is a film of $Co_{72}Cr_{19}Pt_5Ta_2Nb_2$ (by weight %), but the magnetic layer 4 is not limited to this example: it may be replaced by a similar Co-Ni-Cr or Co-Cr-Ta alloy film.

In step S08, the carbon protective layer 5 formed on top of the magnetic layer 4, as well as the lubricant layer 6 formed in the next step, are provided for protection of the magnetic layer 4 against possible collisions with the magnetic head (or with the minute protrusions on the head) while rotating in sliding contact therewith.

Thus, the protective carbon film 5 is required to have appropriate mechanical properties such as mechanical hardness, Young's modulus, negligibly small internal stresses, and good adhesivity. In the example shown in FIG. 1A, the protective carbon film 5 is a film of about 8 nm in thickness.

In step S09, a lubricant layer 6 is formed on the protective carbon film 5 to enhance the wear resistance of the protective carbon film 5. Hence, the lubricant layer 6 is required to have certain important material properties within allowable ranges regarding, for example, coefficient of kinetic friction, lubricity, self-recoverability, anti-stiction characteristic, spin-off characteristic, anti-evaporation characteristic, and anti-decomposition property, where "stiction" is a phenomenon in which two extremely flat surfaces stick together if a liquid layer exists between them, due to a large force arising from a surface energy of the liquid; and "spin-off" is a phenomenon where the lubricant is scattered by a centrifugal force when the disk is in rotational motion at a high speed. Lubricant molecules must adhere to the surface to be lubricated through physical or chemical adsorption for sustained lubrication. The step S09 completes fabrication of the magnetic disc 10.

The lubricant layer 6 incorporated in a memory disc and the method of forming such layer are important features of the invention, which will be described in detail in a later paragraph.

In step S10, the finished magnetic disc 10 is tested if it has required properties. The tests typically include a glide test and a certify test.

In the glide test the disc is span with a head afloat there above at a predetermined height and examined if the head undergoes any contact with a predetermined region of the disc. The contact is detected if any by a piezo element carried on the head.

In the certify test the disk is actually mounted on a disk drive and examined if it has no defective regions and has required read/write characteristics.

[Formation of Lubricant Layer]

FIRST EXAMPLE

Figure 2A:
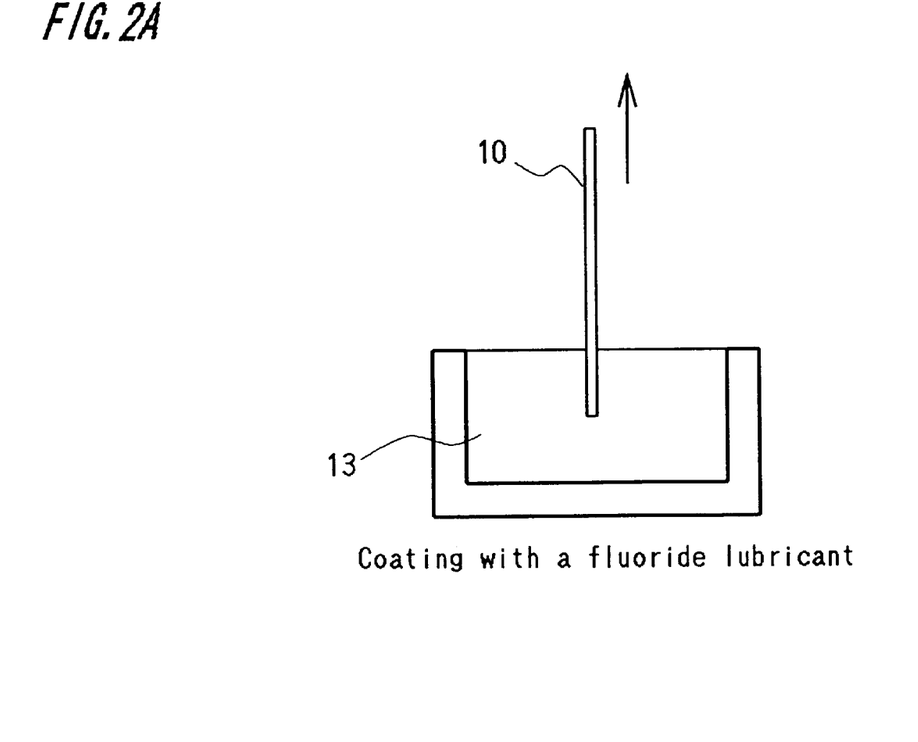
FIGS. 2A–2C are figures useful in understanding the process for forming a first magnetic disc and a lubricant layer on the disc according to the invention.
Figure 2B:
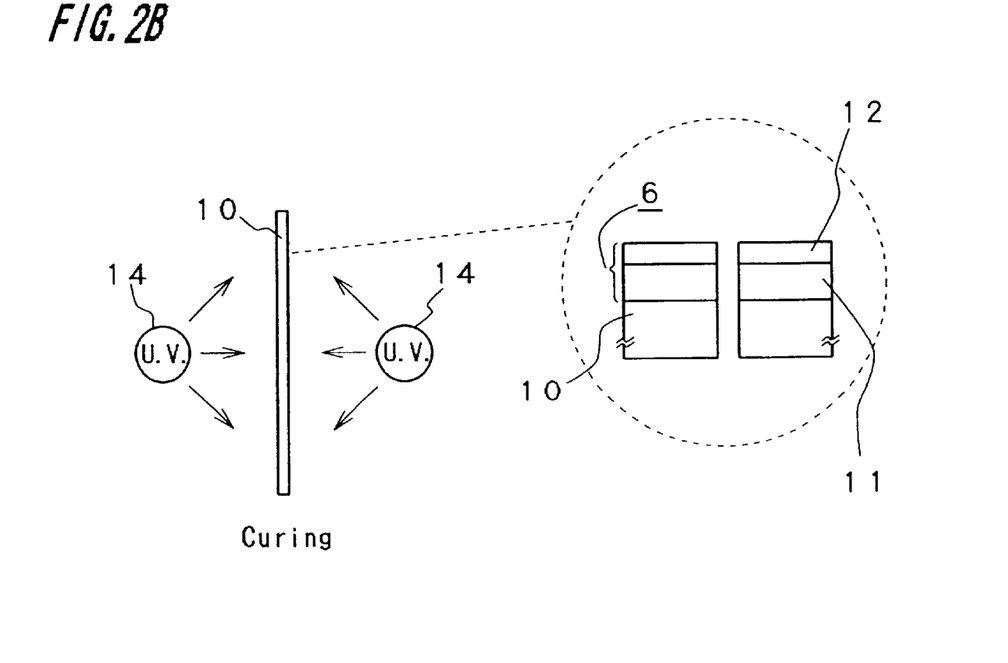
Figure 2C:
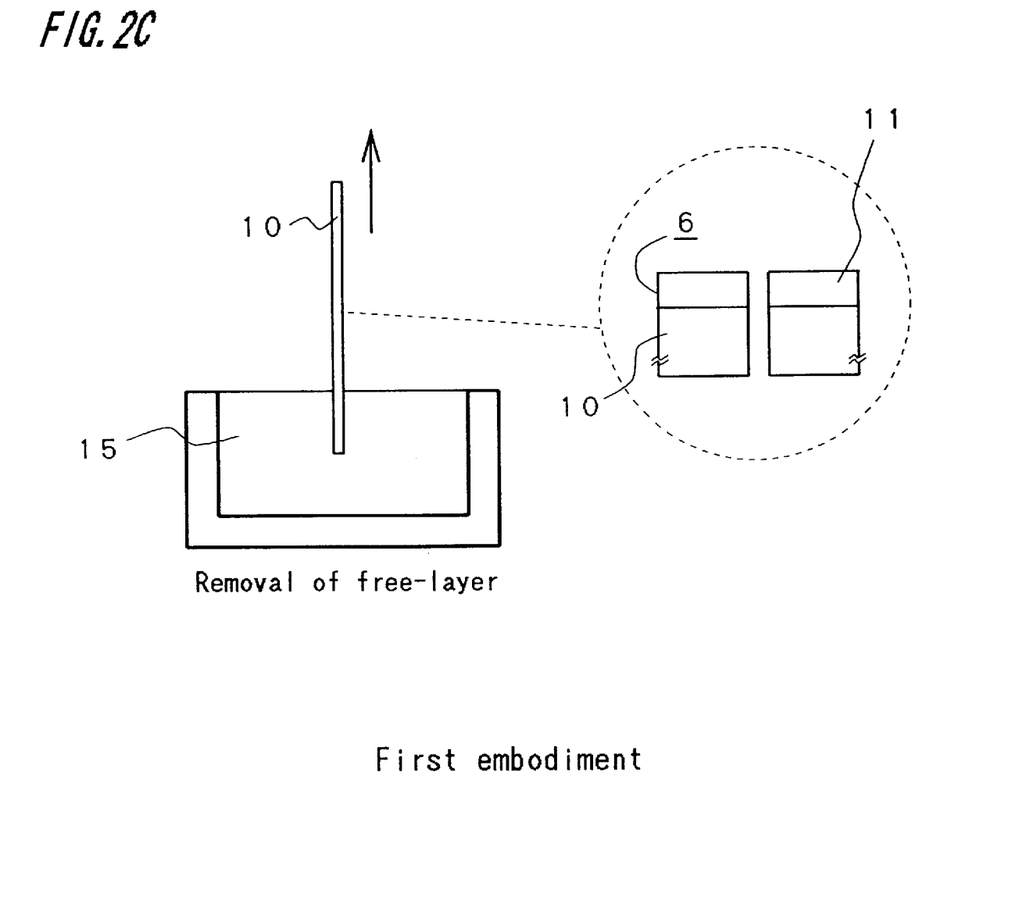

Referring now to FIGS. 2A through 2C, there is shown in sequence details of step S09 shown in FIG. 1B for forming a lubricant layer on a disc.

The disc substrate 10 has been through steps up to step S08 and has thereon a protective carbon film.

As shown in FIG. 2A, the magnetic disc substrate 10, having a protective carbon film 6, is coated with a relatively thick fluoride lubricant layer of about 1.0–2.0 nm, for example. The procedure used for coating the lubricant as well as coating conditions, lubricant, and solvent can be varied arbitrary so long as the resultant lubricant layer 6 acquires a required thickness.

In the example shown herein, the lubricant was "FOMBLIN AM3001" manufactured by Ausimont, which was diluted by a solvent "FLORINATE FC77" manufactured by 3M Co. to a concentration of about 0.1% prior to coating by a dipping method. Coating was done by dipping the disc in the solution for 30 seconds and withdrawn at the speed of 6 mm/second. However, coating may be done by other method such as a spin coat method. The lubricant may be replaced by "FOMBLIN AM2001" manufactured by Ausimont. Table 1 below compares product data on FOMBLIN AM3001 and FOMBLIN AM2001 as provided by the manufacturer. The lubricant may be substituted for by such fluoride lubricants as "FOMBLIN Zdol" from AUSIMONT and "Demnum" from DAIKIN Kogyo Co.

TABLE 1

Properties of FOMBLIN AM3001 and FOMBLIN AM2001

| Article No. | FOMBLIN AM3001 | FOMBLIN AM2001 |
|---|---|---|
| Appearance | Light yellow liquid | Light yellow liquid |
| Average molecular wt | 3200 | 2400 |
| Functional radicals substitution rate | 92 | 94 |
| $C_2F_4O/CF_2O$ | 0.8 | 0.8 |
| Kinematic viscosity (20° C.) | 85 | 75 |
| Specific gravity (20° C.) | 1.75 | 1.73 |
| Vapor pressure (20° C.) | $2.6 \times 10^{-7}$ $(2 \times 10^{-9})$ | $2.6 \times 10^{-4}$ $(2 \times 10^{-6})$ |
| Vapor pressure (100° C.) | $5.2 \times 10^4$ $(4 \times 10^{-6})$ | $2.6 \times 10^{-2}$ $(2 \times 10^{-4})$ |
| Dielectric constant (23° C.) | — | 3.32 |
| Refractive index (20° C.) | 1.382 | 1.345 |
| Surface tension | 24 | 25 |

Next, subsequent to coating a lubricant solution, the substrate 10 is subjected to adhesion treatment, or curing of the solution, for ensuring adhesion of the lubricant to the disc substrate as shown in FIG. 2B. This treatment can be either ultra-violet (UV) light irradiation, heating, or any other appropriate treatment. In the example shown herein, ultra-violet light or short-wavelength ultra-violet light 14 was used for UV cure. The UV light emitter used included different wavelengths ranging from 184 nm to 253 nm. Irradiation continued for about 5–30 seconds.

As shown schematically in FIG. 2B the solution 'splits' into two layers as a result of the curing: one is a non-fluid bonding layer (referred to as bonding layer) 11 adhering to the magnetic disc substrate 10 (i.e. adhering to the protective carbon film 6 shown in FIG. 1); and a fluid layer 12 (referred to as free layer) staying on the bonding layer 11.

The bonding layer 11 is a part of the lubricant 6 cured hard enough to firmly adhering to the magnetic disc substrate 10 so that it remains there against the centrifugal force acting on it if the disc is rotated at a high speed. The free layer 12 is the part of the lubricant not cured sufficiently and remaining still fluid, so that it will flow radially outwardly when the disc is rotated. In general, if the thickness of the lubricant is small, the bonding rate defined by the ratio of the thickness of the bonding layer to the thickness of the entire lubricant layer tends to be large. The bonding rate decreases with the thickness of the lubricant layer.

For further details of bonding/free layers on Magnetic disc substrates, refer to an article titled "Analysis of Adsorption Structure of Perfluoropolyether Lubricants by X-ray Reflectivity" by Mitsuyoshi Shoji, et al., Tribologist, pp 68–75, Vol. 43, No. 3 (1998).

Subsequent to the adhesion treatment, the magnetic disc substrate 10 is cleaned of the free layer 12, using an appropriate solvent or free-layer remover 15. It is convenient to use the same solvent as for diluting the lubricant discussed in connection with FIG. 2A. To do this, the disc substrate may be dipped in the free-layer remover 15 kept in a container. In this example, the free-layer remover 15 was "FLORINATE FC 77", and the dipping period was about 30 seconds. After the removal of the free layer 12, only the bonding layer 11 of a predetermined thickness remains on the magnetic disc substrate 11.

SECOND EXAMPLE

FIG. 3 shows details of step S09 of FIG. 1B, illustrating a second procedure for forming a lubricant layer 6 on the magnetic disc substrate. At this stage the magnetic disc substrate has completed the steps up to step S08 and has a protective carbon layer thereon.

Figure 3A:
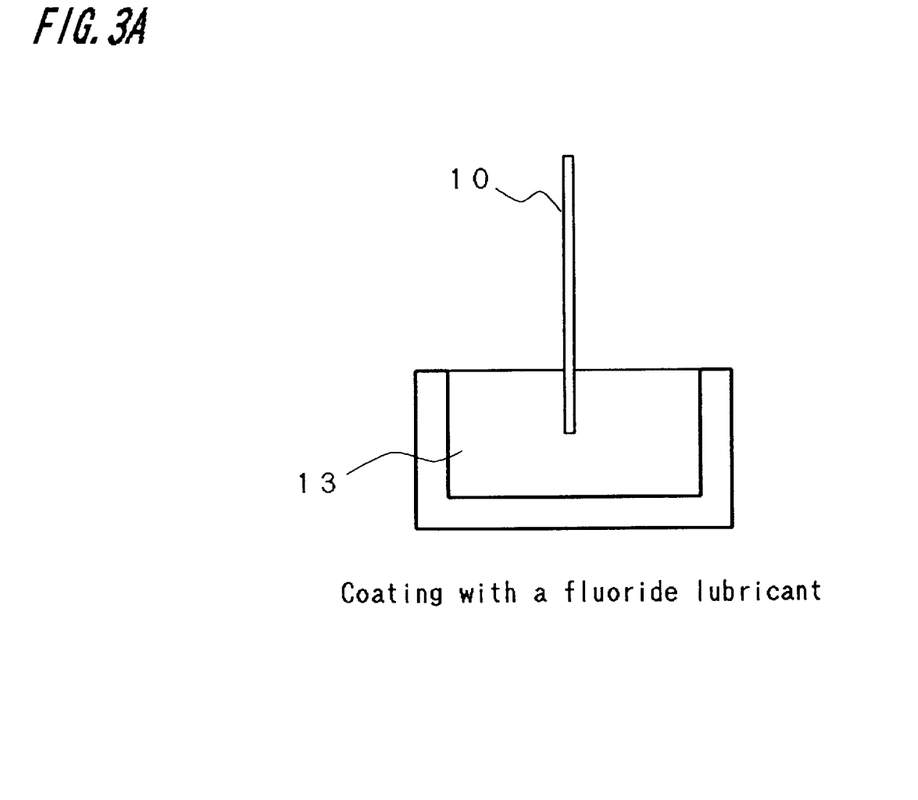
FIGS. 3A–3C are figures useful in understanding the process for forming a first magnetic disc and a lubricant layer on the disc according to the invention.

As shown in FIG. 3A, the magnetic disc substrate 10 is coated with a fairly thick fluoride lubricant layer, the thickness of which is about 2.0 nm in the example shown herein. The same lubricant, solvent, coating method, and coating conditions as for the first example discussed in connection with FIG. 2A may be used equally well in this example.

Figure 3B:
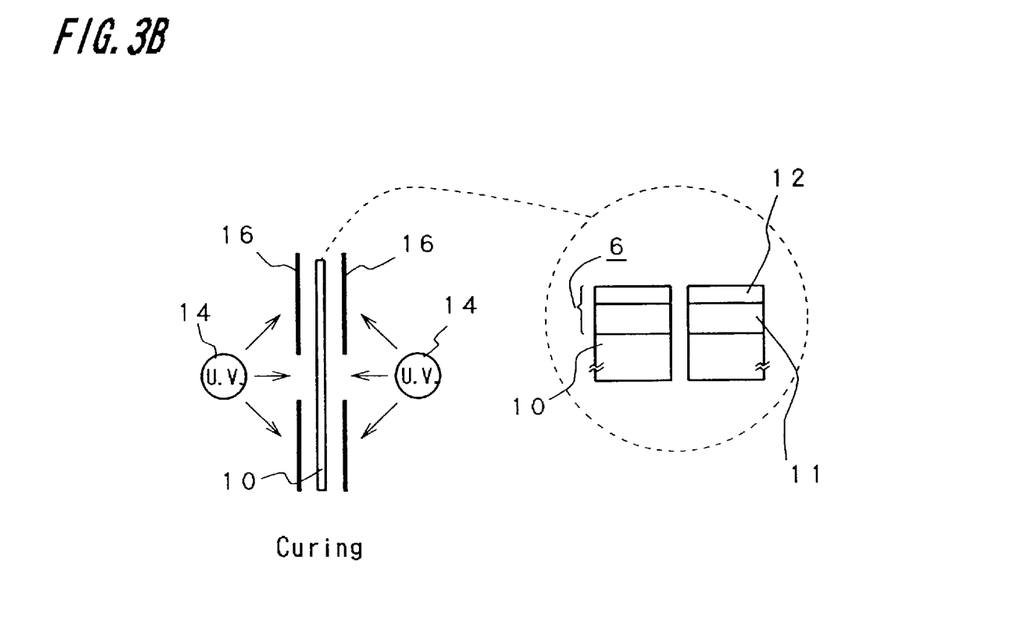

After the magnetic disc substrate 10 is coated with the lubricant 6, the substrate 10 is subjected to a two-stage adhesion treatment as shown in FIG. 3B and described in detail below. It is noted that this adhesion treatment is different from one used in the first example.

(1) In the first stage of the treatment, it is applied only to the lubricant within the CSS region of the magnetic disc substrate 10. The data region (i.e. region other than the CSS region) of the magnetic disc substrate 10 is covered with appropriate shield panels 16 while it is exposed to ultra-violet light or short wavelength ultra-violet light 14 for UV curing of the lubricant layer 6. In the example shown herein the same UV light emitter was used as for the first example (FIG. 2B). The irradiation lasted for a few seconds.

(2) The second stage of the adhesion treatment is given to the entire lubricant layer 6 on the magnetic disc substrate 10 (both the CSS region and the data region)

In this treatment, the shield panels 16 are eliminated prior to the irradiation of ultra-violet or short wavelength light 14 for curing. The source of light may be the same as for the first example. In this example, the light was irradiated for about 5–30 seconds.

It is noted that the adhesion treatments are applied to the lubricant layer 6 in the CSS region on the magnetic disc substrate 10 in the first and the second stages, while the treatment is applied only to the data region in the first stage. It should be understood, however, that the second stage treatment may be omitted, if desired.

The lubricant layer 6 thus treated results in a bonding layer 11 on the magnetic disc substrate 10 (more specifically, on the protective carbon film 5 as shown in detail in FIG. 1A), with an overlying free layer 12 thereon.

Figure 3C:
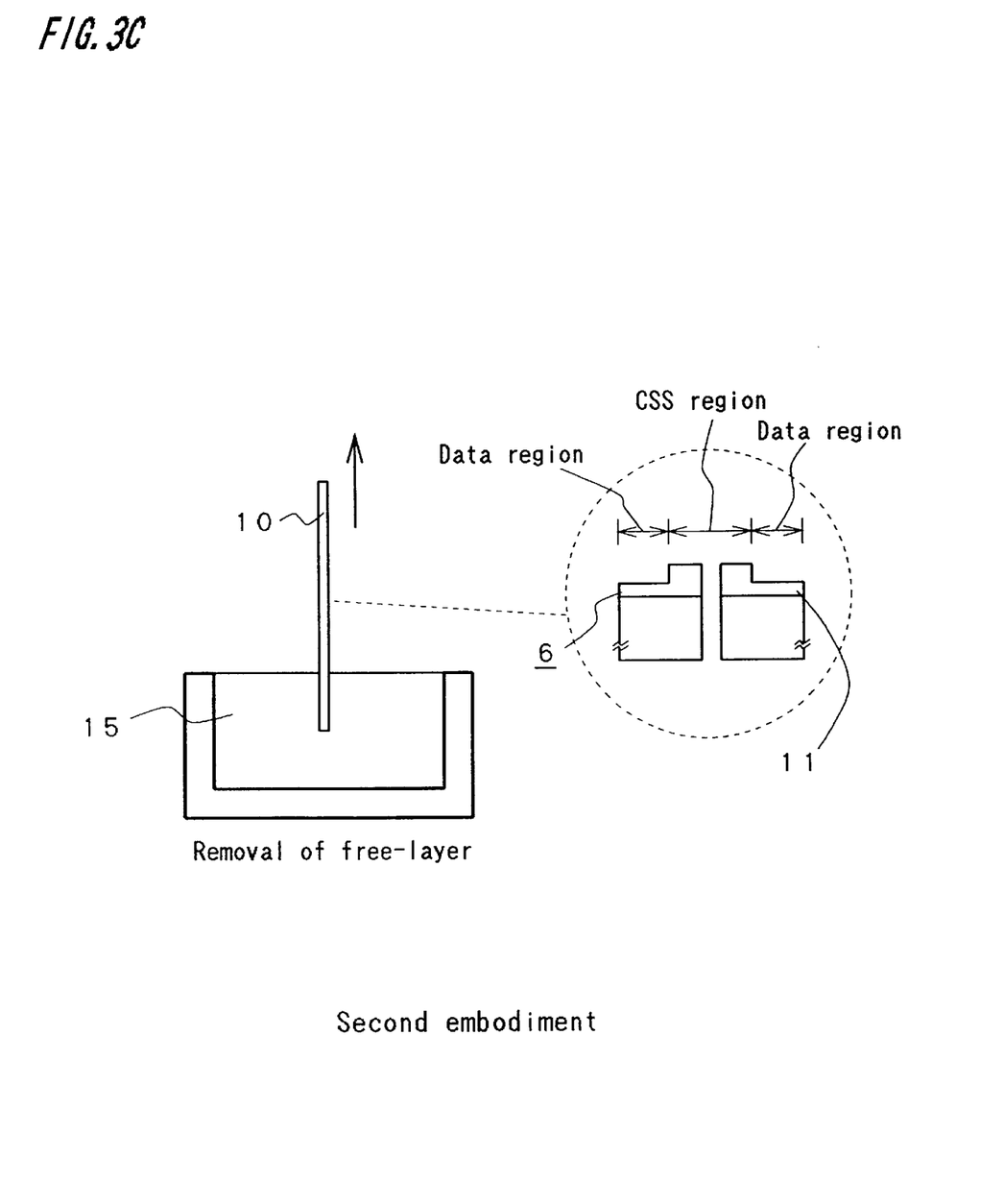

Next, the free layer 12 is removed from the substrate 10 using a free layer remover 15 as shown in FIG. 3C. This removal process may be the same as described in connection with the first example.

After the removal of the free layer 12, the lubricant layer consists essentially of the bonding layer 11 adhering to the protective carbon film 5 of the magnetic disc substrate 10. It should be noted that the bonding layer 11 formed in this manner has a predetermined uniform but a thinner thickness in the data region than in the CSS region.

It should be also noted that in the second example the magnetic disc is provided with a thicker lubricant layer selectively in the CSS region. This does no harm to the magnetic disc since the lubricant layer need not be thick in the data region, although there is a controversy that a thick lubricant layer is preferred in the data region also. They might then use the first method. It should be remembered, however, that if the lubricant layer in the data region is thick, the magnetic head has a greater chance to undergo so-called "flying stiction", which is a kind of bumping or collision of the head with the rapidly rotating disc for some reason. Such flying stiction may be prevented by providing a thinner lubricant layer in the data region. Of course one may still use a lubricant layer 6 having a uniform thickness throughout the CSS region and the data region of the magnetic disc substrate, if desired for some reason. In such a case, the second stage may be omitted.

[Evaluation of Lubricant Layers]

(Structure of the Lubricant Layers)

We performed a series of tests to verify that the lubricant layer 6 of the invention consists essentially of a bonding layer 11 adhering to the magnetic disc substrate 10. The tests were performed also for conventional lubricant layers. The curves were plotted for the decrement in thickness of the lubricants (in ordinate) against spinning hours (in abscissa). The initial thicknesses of the lubricants were 1.6 nm. The discs were span at an ordinary rotational speed. The thickness of each lubricant layer was measured by a Fourier transform infrared spectrometer (PT-IR).

Figure 4A:
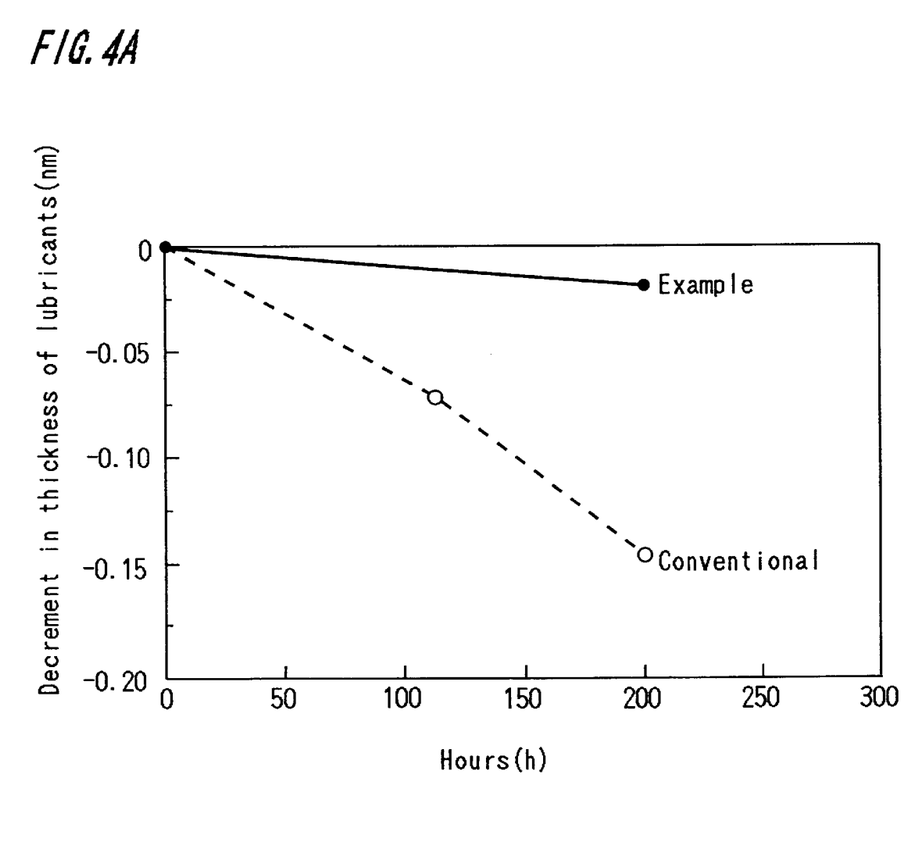
FIGS. 4A and 4B illustrate degree of wear of a lubricant layer on a disc over a given period of use.

As manifested in FIG. 4A, the conventional lubricant layer on the magnetic disc 10 lost its thickness by 0.075 nm in about 115 hours and 0.14 nm after about 200 hours.

In contrast, the lubricant layer of the invention lost its thickness only by 0.02 nm in 200 hours. The experimental data for longer periods are shown in FIG. 4B.

Figure 4B:
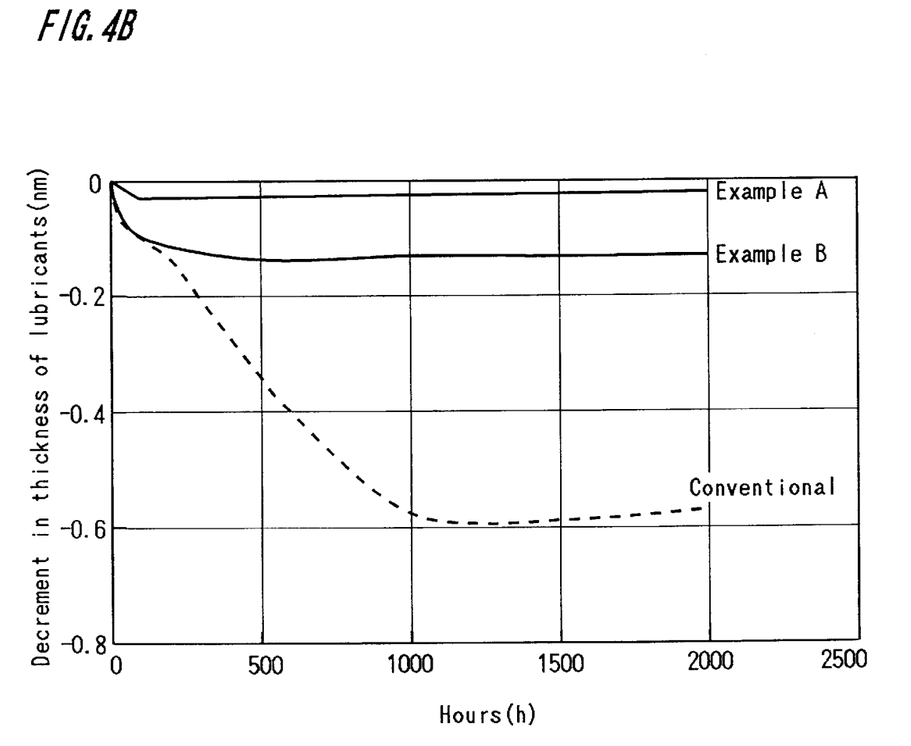

FIG. 4B shows the results of the tests for extended period of spinning up to 2000 hours. Conventional lubricant layers lost thickness as much as 0.34 nm at the end of about 500 hours, and 0.58 nm at about 1000 hours, and 0.6 nm at about 1250 hours, and then the thickness leveled off at this value. This implies that they finally lost 38% of its original thickness since the lubricant layer was initially 1.6 nm and lost on the average 0.6 nm.

On the other hand, the lubricant layer (Example B, FIG. 4A) of the invention lost its thickness of at most about 0.14 nm at the end of about 500 hours, and none thereafter, as seen from FIG. 4B. The total loss amounted to 9% of its original thickness, which implies that more than 90% of the lubricant constitutes a bonding layer.

Another example (Example A, FIG. 4B) exhibited a least decrease of 0.03 nm at the end of about 100 hours, but maintained substantially the same thickness thereafter, up to 2000 hours. The total decrease was 2% of its original thickness.

It could be seen from FIGS. 4A and 4B that the loss of lubricant by the spinning motion is very little in the invention, which supports the fact that the lubricant layer 6 consists essentially of a bonding layer 11 and contains substantially no free layer 12.

It can be said from these experimental results that at least 90% of the lubricant layer of the invention is a bonding layer.

Relationship Between Lubricant Layer and Frictional Force

Figure 5:
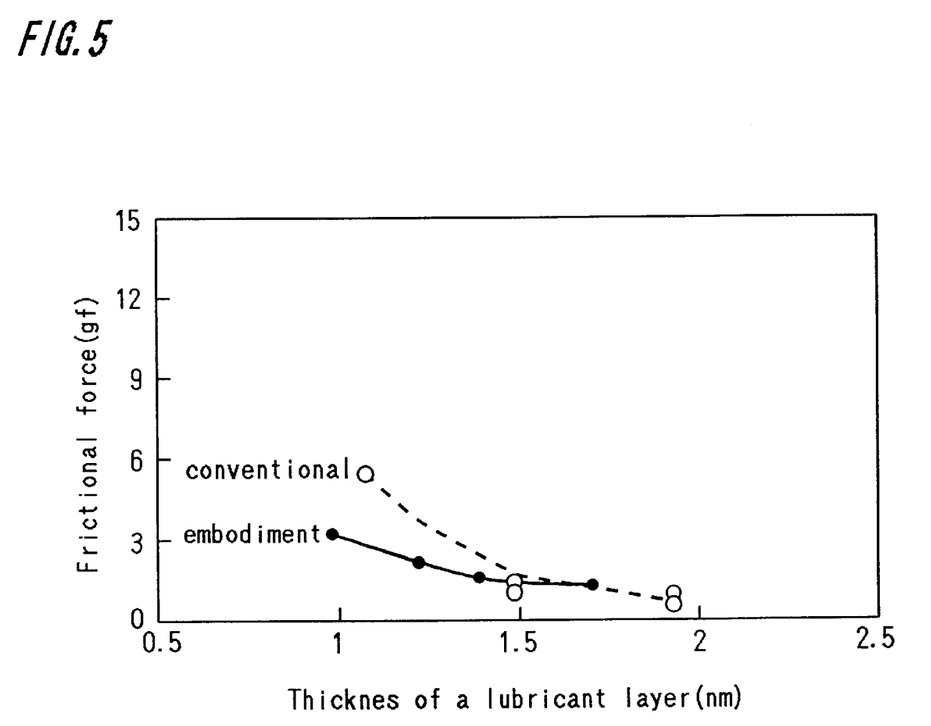
FIG. 5 is a graph showing relationships between the thickness of a lubricant layer and a frictional force for two cases.

FIG. 5 shows the results of the tests performed to verify that the frictional force does not increase significantly if the thickness of a lubricant layer is decreased. The frictional force between the lubricant layer and the head slider is plotted in ordinate in unit of gram (g-force), and the thickness of a lubricant layer 6 in abscissa.

In a conventional magnetic discs, where the lubricant layer includes both a free lubricant layer and a bonding layer, the magnitude of a frictional force is typically about 1.5 gf when the lubricant layer is 1.5 nm or thicker. The frictional force increases to 8.0 gf, for example, as the thickness decreases to 1 nm.

The lubricant layer of the present invention, having only a bonding layer, also has more or less the same frictional force as the conventional ones when the lubricant layer has the same initial thickness of 1.5 nm or thicker. It should be noted, however, that the inventive lubricant layer maintains a low frictional force, which is below 3 gf even if the thickness of the lubricant layer is reduced to 1 nm, for example. In addition, it has been proved in the tests that the lubricant layer still exhibits a sufficient wear resistance.

(Connection Between Average Roughness and Thickness of Lubricant Layer)

Figure 6:
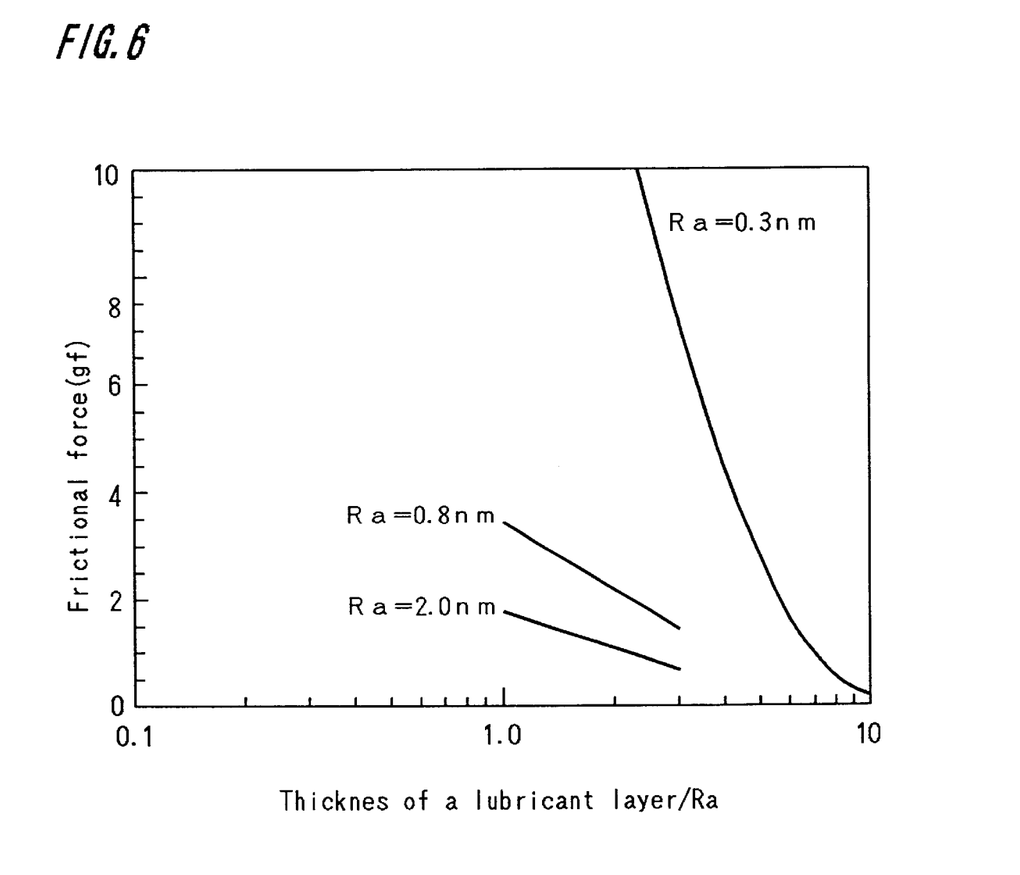
FIG. 6 is a graph showing relationships between the thickness of a lubricant layer and a frictional force for different average roughnesses of the disc.

FIG. 6 is a graphical representation showing a variation of the frictional force in terms of the thickness $t_L$ of the lubricant layer scaled by the average roughness Ra of the surface of a disc substrate (with the average roughness Ra given by the texture treatment in step S04, FIG. 1B). Curves are plotted in the range of $t_L/Ra$ from 0.1 to 10 for three different cases with Ra=2.0 nm, 0.8 nm, and 0.3 nm.

As seen in FIG. 6, when Ra=2.0 nm, the values of the frictional force are: 1.7 gr for $t_L/Ra$=1.0; 1.2 gr for $t_L/Ra$=2.0; and 0.7 gr for $t_L/Ra$=3.0.

When Ra=0.8 nm, the values of the frictional force are: 3.3 gr for $t_L/Ra$=1.0; 2.1 gr for $t_L/Ra$=2.0; and 1.3 gr for $t_L/Ra$=3.0.

When Ra=0.3 nm, the values of the frictional force are: 7.0 gr for $t_L/Ra$=3.0; 1.5 gr for $t_L/Ra$=6.0; and 0.3 gr for $t_L/Ra$=9.0.

It is seen from FIG. 6 that for a given average roughness of Ra=2.0 nm, say, the frictional force increases as the thickness of the lubricant layer becomes thinner. This tendency becomes enhanced as Ra is decreased. The frictional force increases drastically when the lubricant layer becomes as thin as 0.3 nm.

Thus, the lubricant layer is preferably has a thickness in the range from 1.5 nm to 2.5 nm.

Table 2 summarizes the results discussed above.

TABLE 2

Average Roughness of Lubricant Layer of Magnetic Disc and Layer thickness (Summary of Data shown in FIG. 6)

| Average Roughness Ra (nm) | Lubricant Thickness/ Ra | Lubricant Thickness (nm) | Frictional Force (gf) | Evaluation |
| --- | --- | --- | --- | --- |
| 2.0 | 1.0 | 2.0 | 1.7 | X |
| 2.0 | 2.0 | 4.0 | 1.2 | X |
| 2.0 | 3.0 | 6.0 | 0.7 | X |
| 0.8 | 1.0 | 0.8 | 3.3 | X |
| 0.8 | 2.0 | 1.6 | 2.1 | ○ |
| 0.8 | 3.0 | 2.4 | 1.3 | ○ |
| 0.3 | 2.3 | 0.7 | 10.0 | X |
| 0.3 | 3.0 | 0.9 | 7.0 | X |
| 0.3 | 4.0 | 1.2 | 4.1 | X |
| 0.3 | 5.0 | 1.5 | 2.5 | ○ |
| 0.3 | 6.0 | 1.8 | 1.5 | ○ |
| 0.3 | 7.0 | 2.1 | 1.0 | ○ |
| 0.3 | 8.0 | 2.4 | 0.6 | ○ |
| 0.3 | 9.0 | 2.7 | 0.3 | ○ |

A preferred thickness of the lubricant layer of a disc drive of interest may be determined from this Table 2, as follows. The maximum allowable frictional force is first determined, taking into account of several design parameters. Suppose now, for example, that the maximum frictional force is set to 2.5 gf. Then those cases listed in Table 2 with frictional forces that exceed 2.5 gf are marked by crosses (x) in the Evaluation column of Table 2.

If the disc is intended for high density recording, so that it is required to allow for a small floating height for a head and hence a roughness Ra not more than 1.0 nm, then further cases associated with roughness Ra exceeding 1.0 nm (corresponding to Ra=2.0 in the example shown here) are marked by crosses in the Evaluation column of Table 2.

As a result, permissible cases in the example shown herein, as marked by circles (○) in the Evaluation column, are those having a thickness of the lubricant layer of 1.5 nm or greater.

A typical example of a lubricant layer in accord with the invention is one satisfying the exemplary requirements above. This choice guarantees provision of a lubricant layer having an permissible frictional force. The thickness of the lubricant layer may be set in the range from 1.5 nm to 2.7 nm. The upper limit of 2.7 nm is based on the test data listed in Table 2. Thicknesses exceeding this upper limit have not been verified safe in the tests. Thicker lubricant layers may be proved adequate in further tests.

As verified by the tests, the lubricant layer of the invention fabricated by a process described above consists mainly of a bonding layer, so that the lubricant layer will not lose its thickness in a long spinning motion, allowing for a virtually frictionless magnetic disc substrate over a long period of time.

[Magnetic Disc Drive]

A hard disc drive (HDD) utilizing a magnetic disc as shown in FIG. 1 manufactured through steps as shown in FIGS. 2 and 3 will now be described briefly.

Figure 7:
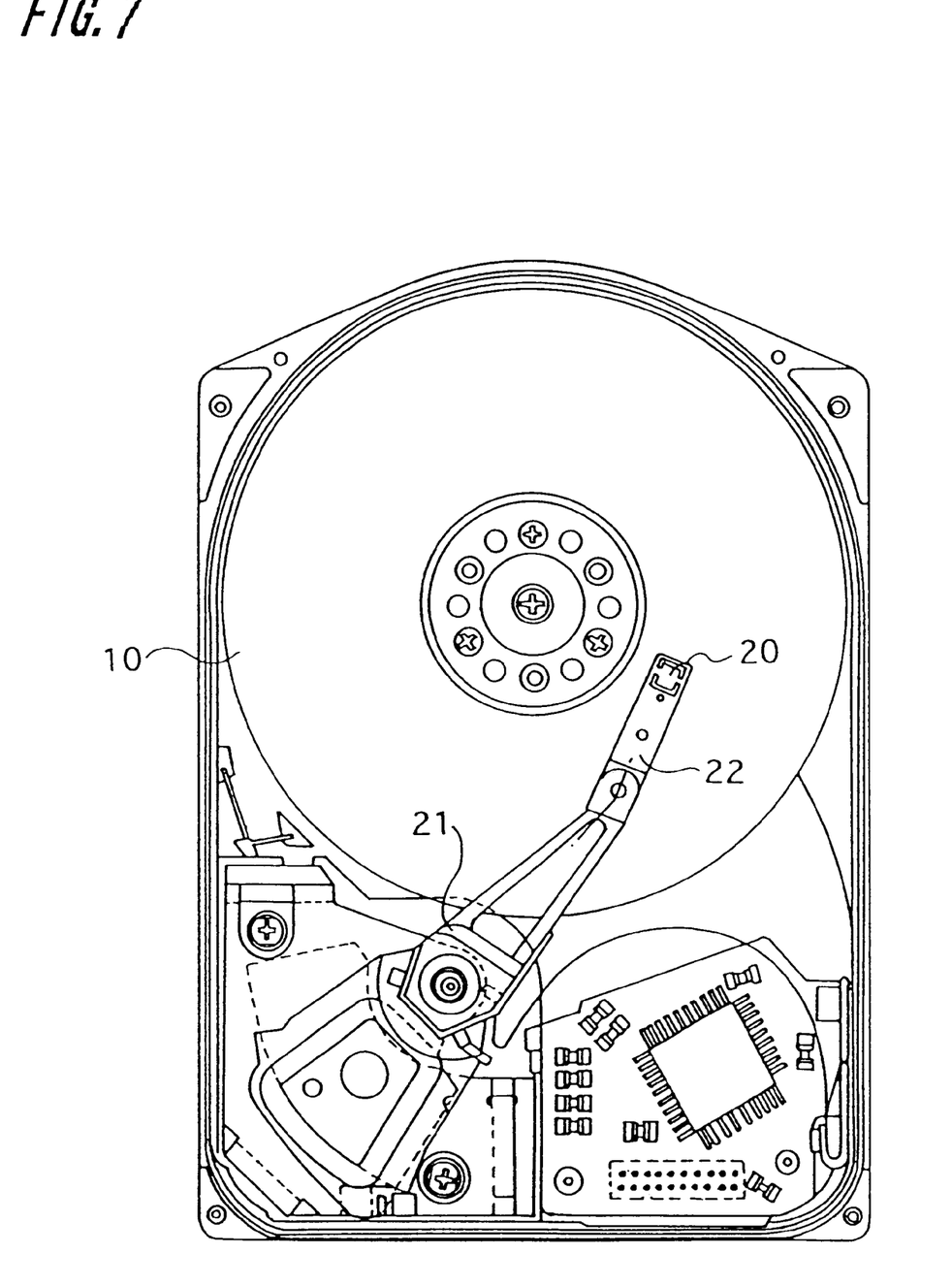
FIG. 7 is a plan view of a hard disc drive (HDD) utilizing a magnetic disc.

Generally an HDD has a structure as depicted in FIG. 7. A magnetic disc 10 serves as a magnetic medium of the HDD. The HDD has a magnetic head 20 provided at the end of an adhesion-free slider 22 designed to support the magnetic head and prevent adhesion of the slider to the magnetic disc. The magnetic head is arranged to face the magnetic disc 10 and is adapted to float at a height of about 20 nm above the magnetic disc 10 during read/write operations. The magnetic head is normally a magnetoresistive (MR) head or a giant magnetoresistive (GMR) head. The head may be positioned by a two-step actuator 21 which consists of an ordinary actuator and an electromagnetic microactuator.

In summary, the invention provides a memory disc bearing thereon a lubricant layer which consists essentially of a non-fluid bonding layer. The lubricant layer has a greatly reduced friction with the slider supporting the magnetic head during a read/write operation, for an extended period of time, thereby minimizing wear of the lubricant layer.

The lubricant layer can be made thicker in the CSS region than in the data region of the memory disc, further reducing friction between the lubricant layer and the head slider in the CSS region, and hence wear of the lubricant layer, thereby improving the lifetime of the HDD.

Therefore, the invention can provides the improved magnetic disc. The invention also provides a method for manufacturing such improved magnetic disc.

While the invention has been particularly shown and described with reference to preferred embodiments thereof, it will be understood by the those skilled in the art that various other changes in the form and details may be made therein without departing from the sprit and scope of the invention.

What is claimed is:

1. A method of manufacturing a magnetic memory disk, comprising the steps of:

forming a carbon protective layer on a disk substrate having an average roughness Ra of 1.0 nm or less;

forming a lubricant layer whose thickness is 1.5 nm or more by coating a lubricant on said carbon protective layer;

irradiating said lubricant layer with ultra-violet light; and removing a free layer of said lubricant layer by a solvent, whereby said lubricant layer consists of a bonding layer of lubricant, said bonding layer being a non-fluid layer.

2. A method of manufacturing a magnetic memory disk, comprising the steps of:

forming a carbon protective layer on a disk substrate having an average roughness Ra of 1.0 nm or less;

forming a lubricant layer by coating lubricant on said carbon protective layer;

irradiating with ultra-violet light said lubricant layer within a CSS region of said disk substrate;

irradiating with ultra-violet light entire of said lubricant layer on said disk substrate; and removing a free layer of said lubricant layer by a solvent, whereby said lubricant layer whose thickness is 1.5 nm or more is formed on said CSS region selectively.

* * * * *